April 21, 1970   M. H. AGEE ET AL   3,507,472
SEAT MOUNTING WITH TELESCOPICALLY ARRANGED SLIDE MEANS
Filed May 16, 1967

INVENTORS
MARIE H. AGEE
THEODORE C. SAUTTER
PETER COJEI

BY Hauke, Krass, & Gifford
ATTORNEYS

# United States Patent Office 3,507,472
Patented Apr. 21, 1970

3,507,472
SEAT MOUNTING WITH TELESCOPICALLY
ARRANGED SLIDE MEANS
Marie H. Agee, Lapeer, Theodore C. Sautter, Detroit, and
Peter Cojei, Lathrup Village, Mich., assignors to Howell
Industries, Inc., Detroit, Mich., a corporation of
Michigan
Filed May 16, 1967, Ser. No. 638,851
Int. Cl. B60m 1/08; F16m 11/00, 13/00
U.S. Cl. 248—429
6 Claims

ABSTRACT OF THE DISCLOSURE

A seat mounting having a tubular slide member with full sleeve plastic bearings telescopically and slidably mounted on an elongated tubular support to provide an adjustable connection between a seat supporting carriage and a floor mounted base.

A pair of opposingly mounted, C-shaped latch members having interengaged arms are mounted on the slide member for co-acting movement between locking positions in which they are received by a selected pair of apertures in the sidewalls of the slide member and the tubular support to lock the carriage to the base in an adjusted position, and release positions in which they permit such adjustment.

BACKGROUND OF THE INVENTION

Field of the invention

This invention relates to vehicle seat mounting devices, and more specifically to a mounting device having a base with an elongated tubular support member, a carriage having a tubular slide member telescopically mounted on the support member for longitudinal movement, and latch means for interlocking the slide member to the support member at selected longitudinal positions.

Description of the prior art

Automotive seat mounting devices usually include a track secured to the vehicle floor and a carriage fastened to the seat and longitudinally, slidably mounted on the track to permit the position of the seat to be adjusted to accommodate its preferences of the occupant. A manually operated latch connected between the carriage and the track is selectively operable to either lock the carriage against sliding on the track, or to release the carriage for adjustment.

There are two objectives which must be met by any adjustable seat mounting device. First, the carriage must readily slide on the track between adjusted positions when the latch is in its release position. Secondly, the latch must provide a non-yielding connection between the carriage and the track in its locking position.

The aforementioned objectives must be met by an arrangement of components that can be economically fabricated and assembled, and have a long-wearing and reliable working life.

Several attempts have been disclosed in the prior art for meeting the aforementioned objectives by providing a base having either a partially or fully closed tubular supporting track, a carriage having a tubular slide member mounted on the track with some form of bearing means being interfitted between the slide member and the track. The tubular slide and track arrangement has special safety advantages because the tubular wall of the slide completely encircles the supporting track. This arrangement eliminates the problem of the carriage tending to separate from the track under the influence of abnormal forces acting on the seat assembly during a collision or the like.

Typically roller bearings or ball bearings have been employed between the opposed surfaces of the slide and the track. The drawbacks of these conventional bearings are related to the inherent expense of ball or roller bearings and the mounting structure required to support these types of bearings in position.

One approach of the prior art to eliminate the necessity for expensive ball and roller bearings, while still providing free sliding engagement between the tubular slide and support members, has been to mount a plurality of bearing slugs of anti-friction material such as nylon at spaced intervals along the track. The disadvantage with this arrangement is that the tubular walls of the slide and support members must be formed with special transverse cross-sections to retain the bearing slugs in place.

The broad purpose of the present invention is to provide a seat mounting having a tubular slide member mounted on a tubular support member for longitudinal movement with full sleeve bearings of a low friction, low cost material being interfitted between the slide and support members. Both tubular members are formed of standard cross-sections so that a reliable and long-wearing seat mounting can be economically fabricated and easily assembled with a minimum number of components. In addition it is the purpose of the invention to provide a novel form of latch for releasably locking the tubular slide member at selected longitudinal positions along the support members.

SUMMARY

The preferred embodiment of the present invention, which will be subsequently described in greater detail, comprises a base having forward and rearward upright supports adapted for mounting to the floor of a vehicle and connected to the ends of an elongated tubular support member. The forward support has an inclined midsection formed to yield in a predetermined manner in response to the application of an abnormal loading on the support member, such as may occur during a collision or the like.

A tubular slide member, having a bracket adapted for attachment to a seat assembly, has a pair of longitudinally spaced sleeve bearings of a suitable low friction plastic material press fitted with its bore and adjacent the ends thereof. The tubular slide member and the full sleeve bearings are telescopically mounted on the tubular support and longitudinally slidable thereon. The bearing surface of each sleeve preferably has a series of grooves to reduce the frictional contact area while providing a weight transfer connection between the slide member and the tubular support.

In another form of the invention, the preferred sleeve bearings have dimpled bearing surfaces to reduce the frictional bearing engagement while completely encircling the support member.

The telescopic arrangement of the tubular slide mounted on the tubular support with full sleeve low friction plastic bearings permits the slide and the support to be fabricated from standard shaped tubular sections in a low cost, non-separable combination.

The preferred latch mechanism takes the form of a pair of substantially C-shaped latch members, opposingly arranged with the midportions of their upper arms pivotably attached to the tubular slide so that their lower arms are swingable toward and away from one another between locking and release positions. In their locking positions, the ends of the lower arms engage aligned apertures in the sidewalls of both of the tubular slide and tubular support to lock them against relative longitudinal movement. A spring member normally biases the lower latch arms toward their locked position. A handle member attached to one of the latch members simultaneously moves both latch members to their release position by means of inter-engaged upper latch portions so that the slide member can be quickly and easily adjusted between different positions on the support member.

This novel form of latch mechanism comprises a relatively few components, requires a minimum operating area, is extremely reliable in operation, and provides a two point connection in their locking position by engaging both sidewalls of the slide member and the support member.

It is therefore an object of the present invention to provide a seat mounting structure having a base adapted for attachment to the floor of a vehicle supporting an elongated tubular support member, a carriage adapted for attachment to a seat assembly and having a tubular slide member telescopically mounted on and completely surrounding the tubular support with full sleeve low friction plastic bearings interfitted between the tubular slide and the tubular support so that the carriage is longitudinally movable along the support member.

It is another object of the present invention to provide an improved seat mounting device having a base with an elongated tubular support, and a carriage slidably mounted thereon by a pair of spaced apart low friction sleeve bearings, having grooves in their sliding surfaces to reduce the frictional contact area.

It is another object of the present invention to provide a novel latch mechanism for inter-connecting a pair of telescopically engaged, elongated tubular members by providing a pair of opposed substantially C-shaped latch arms pivotably mounted on the outermost tubular member and projectable into apertures provided in opposite sidewalls of both of the tubular members.

Still further objects and advantages of the present invention will readily occur to one skilled in the art to which the invention pertains upon reference to the following detailed description.

DESCRIPTION OF THE PREFERRED EMBODIMENTS

Figure 1:
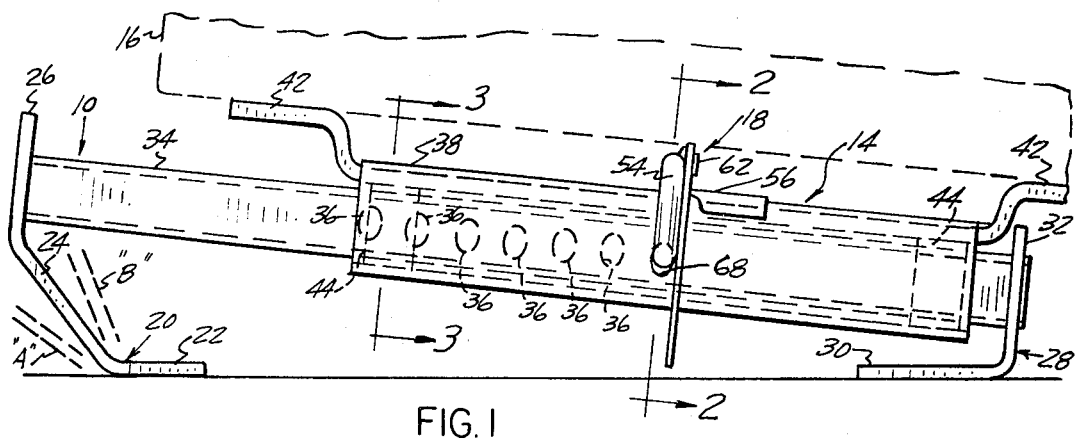
FIGURE 1 is an elevational view of a seat mounting illustrating the preferred embodiment of the present invention.

Now referring to the drawing, a preferred seat mounting is illustrated therein as comprising a base 10 attached to the floor 12 of a vehicle. A carriage 14 is longitudinally slidably mounted on the base 10 and adapted for attachment on the underside of a seat assembly 16. Latch means 18, mounted on the carriage 14, is operable to lock the carriage 14 at a selected longitudinal position with respect to the base 10.

Figure 3:
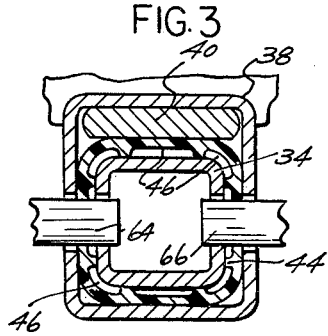
FIGURE 3 is a fragmentary sectional view taken along lines 3—3 of FIGURE 1.

Referring to FIGURES 1 and 3, the base 10 comprises a forward, upright support 20 having a lower flange portion 22 adapted for attachment to the floor 12, an inclined intermediate portion 24 and an upper portion 26. The upright support 20 is normally in the position illustrated in FIGURE 1, however the intermediate portion 24 flexes downward toward the position illustrated at "A" in reaction to the application of a generally downward force of a predetermined magnitude applied to the base 10 such as might occur in a front-end collision or the like where the seat occupant's weight, restrained by a suitable seat belt assembly (not shown), causes the occupant to have a generally downwardly directed momentum. Similarly the intermediate portion flexes upwardly toward a position illustrated at "B" in reaction to a generally upwardly directed force acting on the base 10, such as might be produced by a rear end impact on the vehicle which causes the seat assembly to pivot backwardly about its support.

A generally right angle strap 28 having a flange portion 30 adapted for attachment to the vehicle floor 12 and an upright section 32 is longitudinally spaced rearwardly from the forward upright support 20. The upper portion 26 of the forward support and the upright section 32 of the rear support are apertured to receive an elongated support tube 34 which is securely joined to the support sections by welding or the like.

The elongated support tube 34 preferably has a square cross-section. A series of elliptical apertures 36 are provided in opposite sidewalls of the support tube 34 at regularly spaced intervals and in pairs, each pair being aligned on an axis transverse to the longitudinal axis of the support tube 34. Each aligned pair of the apertures 36 corresponds to different adjusted longitudinal positions between the carriage 14 and the base 10.

Figure 2:
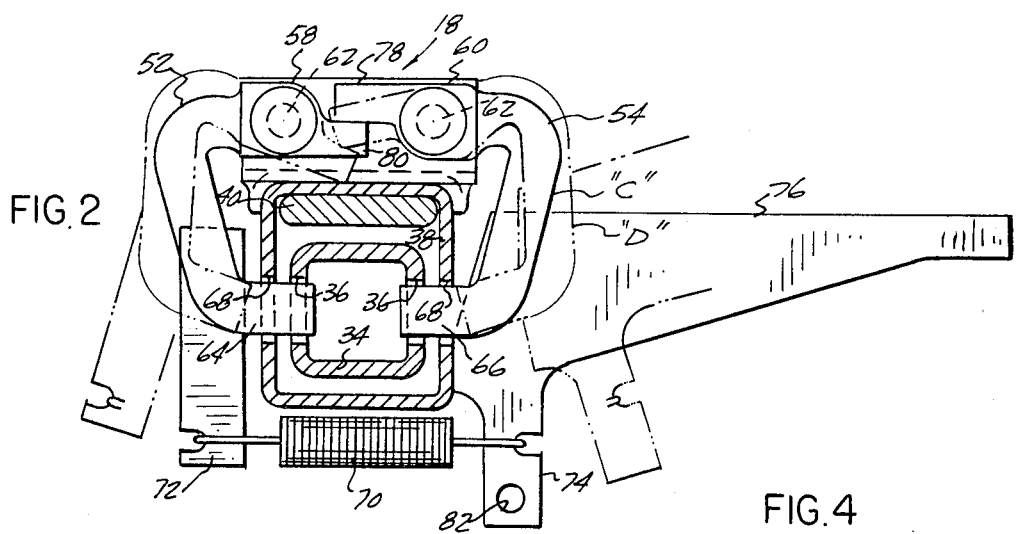
FIGURE 2 is an enlarged transverse sectional view taken along lines 2—2 of FIGURE 1 and showing the preferred latch mechanism in locking and release positions.

Referring to FIGURES 1, 2, and 3, the carriage 14 comprises a tubular slide member 38 having a rectangular cross-section and arranged in telescopic relationship with the support tube 34 so that the sidewalls of the slide member 38 completely encircle support tube 34. An elongated rigid flat strap 40 having upturned end portions 42 adapted for attachment to the seat assembly 16 as by threaded fasteners or the like has an intermediate portion disposed within the slide member 38. The strap 40 is fixed to the slide member 38 by welding or the like. This arrangement ensures that the strap 40 and the seat assembly 16 can not be separated from the base 10 by violent and substantial forces acting upwardly on the seat assembly.

Short bearing sleeves 44 are carried adjacent each end of the slide member 38 and provide a weight-transfer connection between the strap 40 and the support tube 34. The sleeves 44 are press fitted into the bore of the slide member 38 and move with it more as a unit. The sleeves 44 have an inner bore complementary to the outer surface of the support tube 34 to provide a generally tight fitting slidable engagement with the support tube. The sleeve 44 are formed of a suitable low friction plastic material such as nylon, Delrin or the like.

Referring to FIGURE 3, the mid-portion and each corner of each side of the sleeves 44 has a groove 46 extending the full length of their inner surface in the direction of their movement relative to the support tube 34. The grooves 46 reduce the bearing contact surface and the frictional resistance to relative movement between the carriage 14 and base 10 when the latch means 18 is in its release position.

Figure 5:
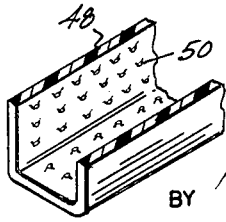
FIGURE 5 is a perspective view illustrating another form of sleeve having a dimpled bearing surface.

Referring to FIGURE 5, an alternative bearing sleeve 48 is illustrated therein which may be incorporated in place of a sleeve 44. Sleeve 48 has a dimpled bearing surface 50. The dimpled bearing surface 50 has discontinuities which reduce the frictional contact area of the sleeve 48.

Now referring back to FIGURES 1 and 2, latch means 18 comprises a pair of generally C-shaped latch members 52 and 54 which are pivotably connected to a support member 56 attached to the slide member 38. Mid-portions 58 and 60 of the upper arms of the latch members 52 and 54, respectively, are pivotably attached by pins 62 mounted to an upright portion of the support member 56 so that the latches 52 and 54 are each pivotable about an axis parallel to the direction of longitudinal movement of the carriage 14 on the support tube 34.

The latch members 52 and 54 are movable about their respective pivots between a locking position illustrated in FIGURE 2 wherein their lower arms 64 and 66, respectively, are received by apertures 68 in the sidewalls of the slide member 38 and a selected pair of apertures 36 in the sidewalls of the support tube 34; and a release position wherein the lower arms 64 and 66 are spaced apart from one another and disengaged from the apertures 68 and 36 to permit the carriage 14 to freely slide on the support tube 34. A spring member 70 is connected between a downward depending lug 72 carried by the latch member 52 and a similar downward depending lug 74 carried by the latch member 54 to urge the latch members 52 and 54 toward their locked position illustrated at "C" in FIGURE 2.

A handle 76 attached to the latch member 54 and preferably integrally formed with the lug 74 provides means for pivoting the latch member 54 upwardly toward its release position. An end portion 78 of the upper arm of the latch member 54 abuts the upper edge of end portion 80 of the latch member 52 and is formed such that as the latch member 54 pivots towards its release position, the end portion 78 produces a downward force on the end portion 80 so that the arm 64 of latch member 52 is disengaged from the apertures 36 and 38 simultaneously with the lower arm 66 of the latch member 54 so the two latch members are moved together toward their release position illustrated in phantom at "D" in FIGURE 2.

The novel latch means 18 has a number of advantages over conventional latch members. In then locking position, the latch members 52 and 54 engage both sides of the slide member 38 and the support tube 34. Preferably the latch membars 52 and 54 have a circular cross-section to provide a close fitting engagement with the apertures 36 and 68 in the tubular members when in their locked position. The handle 76 provides means for moving both of the latch members 52 and 54 toward their release position in one easy motion.

The lower end of the lug 74 is apertured at 82 to provide a connection with a second seat mounting device (not shown) which is transversely spaced in the vehicle through a Bowden cable (not shown) handle 76 can simultaneously release the latch means 18 of both mounting devices.

Figure 4:
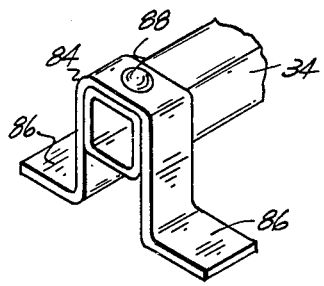
FIGURE 4 is a perspective view of another form of upright support member.

FIGURE 4 illustrates another forward upright support for the support tube 34 comprising a substantially rigid U-shaped bracket 84 having a downward facing U-shaped section with laterally directed flanges 86 adapted to be secured to the floor of the vehicle. The support tube 34 is attached to the mid-section of the bracket 84 by rivets 88 or the like. The primary difference between the bracket 84, and the upright support 20 of FIGURE 1 is that the support 20 yields in reaction to substantial and predetermined forces acting on the support tube 34 whereas the bracket 84 provides a substantially non-yielding, rigid support when substantial vertical forces are applied to the support tube 34.

It is to be understood that we have described our invention in its simplest terms and that various changes and modifications can be made therein without departing from the spirit of the invention as expressed in the scope of the appended claims.

We claim:

1. In an adjustable seat mounting, the combination comprising:
   (a) an elongated tubular support member;
   (b) a slide member mounted on the support member so as to be movable therealong between adjusted positions, one of said members being adapted for attachment to a seat structure and the other of said members being adapted for attachment to a floor structure or the like;
   (c) means on said slide member and said support member providing a plurality of regularly spaced apertures spaced along said members, any of a pair of aligned apertures being associated with an adjusted position of the slide member with respect to the support member;
   (d) a pair of latches carried by said slide member, and connected to one another so as to be movable either toward locking positions on opposite lateral sides of the support member in which they engage seletced aligned apertures to lock the slide member in an adjusted position, or toward release positions on opposite lateral sides of the support member in which they are disengaged from the said aligned apertures to permit adjustment of the slide member relative to the support member; and
   (e) bias means for urging the latches toward their respective locking positions.

2. A combination as defined in claim 1, in which the tubular support has spaced side walls, and the means providing said plurality of apertures comprise a series of openings formed in each of said side walls, each opening in one side wall being formed to receive one of the latches, and each opening in the other side wall being formed to receive the other latch.

3. A combination as defined in claim 2, including a handle connected to one of the latches, the handle being operable to move the latches together from their locking positions toward their release positions.

4. A combination as defined in claim 2 in which the latches are connected together so as to move toward one another as they are moved toward their locking positions, and to move away from one another as they are moved toward their release positions.

5. The combination as defined in claim 4, in which the bias means comprises a spring member connected between the two latches to urge them towards one another.

6. In a vehicle having a floor structure and seat structure, an adjustable seat mounting comprising:
   (a) a base attached to the floor structure;
   (b) an elongated tubular support mounted on the base generally parallel to the floor structure, the tubular support having side walls and a plurality of regularly spaced openings in each side wall longitudinally spaced along the support, each opposite pair of said openings being formed along a common axis;
   (c) a tubular slide attached to the seat structure having a pair of openings and telescopically mounted on the support so as to be movable therealong between adjusted positions;
   (d) a pair of latches pivotally mounted on the slide and connected together so as to be movable toward one another into locking positions in which they are received in selected aligned openings of said slide and said support to lock the seat structure in an adjusted position with respect to the floor structure, and away from one another toward release positions in which the seat structure is movable toward adjusted positions with respect to the floor structure;
   (e) a spring connected between the latches to bias them toward locking positions; and (f) a handle connected to the latches for moving them toward their release positions.

References Cited

UNITED STATES PATENTS

| | | | |
|---|---|---|---|
| 1,357,825 | 11/1920 | Shaw | 248—408 |
| 1,962,789 | 6/1934 | Simpson et al. | 248—430 |
| 2,662,712 | 12/1953 | Rose | 248—408 |
| 2,154,294 | 4/1939 | Whedon | 248—429 |
| 2,195,349 | 3/1940 | Woina | 248—430 |
| 2,335,254 | 11/1943 | Atwood et al. | 248—429 |
| 2,336,433 | 12/1943 | Woina | 248—430 |
| 2,951,527 | 9/1960 | Wassilieff | 248—430 |
| 3,059,966 | 10/1962 | Spielman | 297—216 |
| 3,095,247 | 6/1963 | Zelewsky | 308—3 |
| 3,128,592 | 4/1964 | Calvert et al. | 308—4 |
| 3,145,051 | 8/1964 | Rausch | 297—216 |
| 3,258,240 | 6/1966 | Kirk | 248—430 |

FRANCIS K. ZUGEL, Primary Examiner

U.S. Cl. X.R.

297—216